(No Model.) 2 Sheets—Sheet 1.
A. C. BRANTINGHAM.
DUST COLLECTOR.
No. 527,937. Patented Oct. 23, 1894.
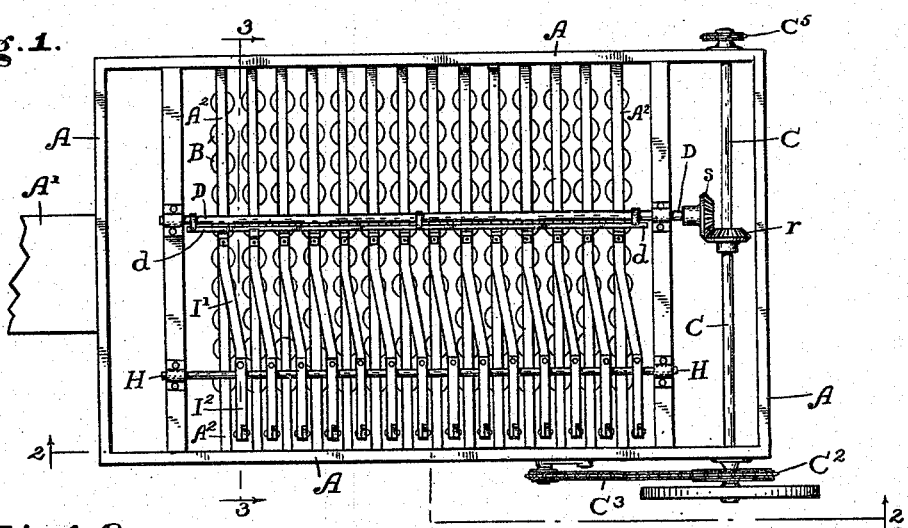
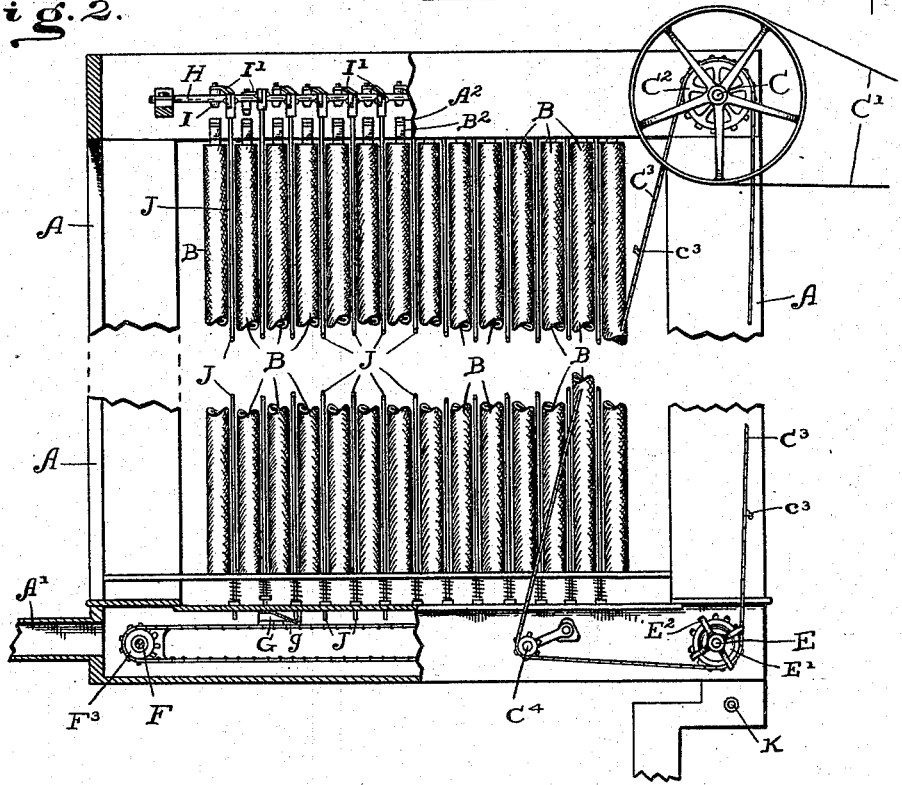
WITNESSES:
F. W. Kramer.
J. A. Walsh.
INVENTOR:
Allen C. Brantingham,
BY Chester K Bradford,
ATTORNEY.

(No Model.) 2 Sheets—Sheet 2.

A. C. BRANTINGHAM.
DUST COLLECTOR.

No. 527,937. Patented Oct. 23, 1894.

WITNESSES:
F. W. Warner.
J. A. Walsh.

INVENTOR:
Allen C. Brantingham,
BY Chester Bradford,
ATTORNEY.

UNITED STATES PATENT OFFICE.

ALLEN C. BRANTINGHAM, OF TOLEDO, OHIO, ASSIGNOR TO THE NORDYKE & MARMON COMPANY, OF INDIANAPOLIS, INDIANA.

DUST-COLLECTOR.

SPECIFICATION forming part of Letters Patent No. 527,937, dated October 23, 1894.

Application filed March 27, 1894. Serial No. 505,294. (No model.)

*To all whom it may concern:*

Be it known that I, ALLEN C. BRANTINGHAM, a citizen of the United States, residing at Toledo, in the county of Lucas and State of Ohio, have invented certain new and useful Improvements in Dust-Collectors, of which the following is a specification.

My present invention relates to the same class of dust collectors as shown and described in my applications Serial No. 490,875, filed November 14, 1893, and Serial No. 499,905, filed February 12, 1894; it differing from that shown in the last named application mainly in that a series of hammers with mechanism for bringing them successively into operation is used, instead of a single traveling hammer which is brought successively into position to operate upon one tube or series of tubes after another.

Said invention will be first fully described, and the novel features thereof then pointed out in the claims.

Figure 3:
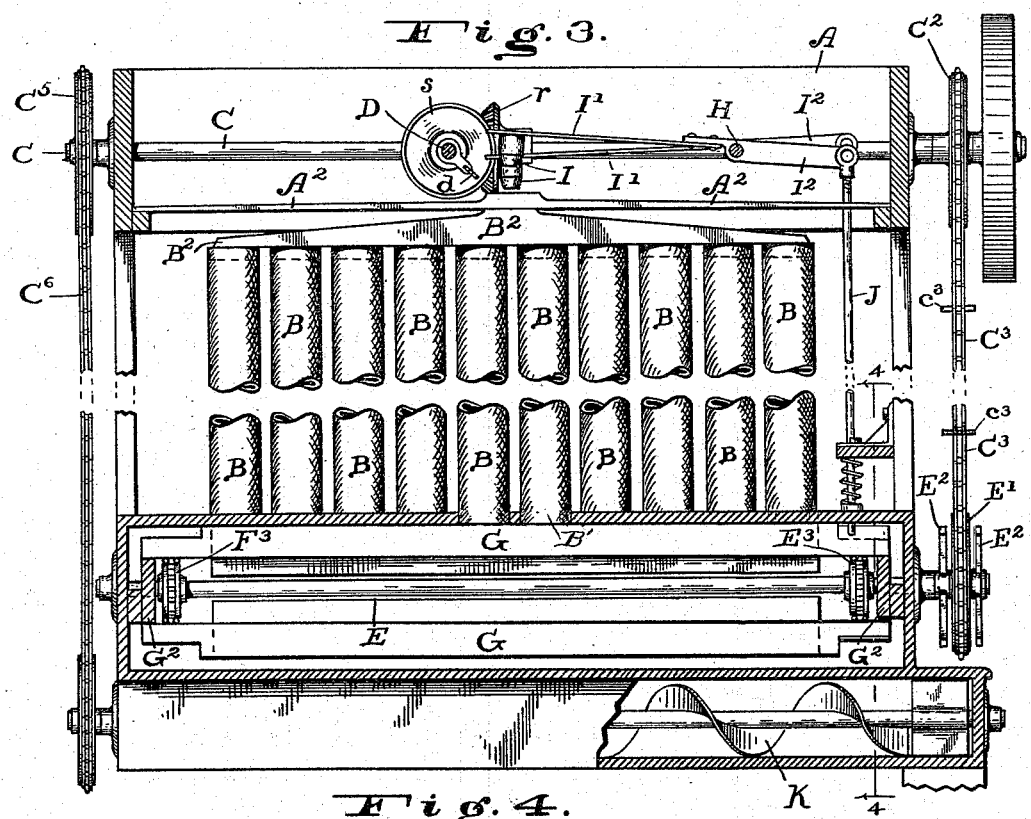
Figure 4:
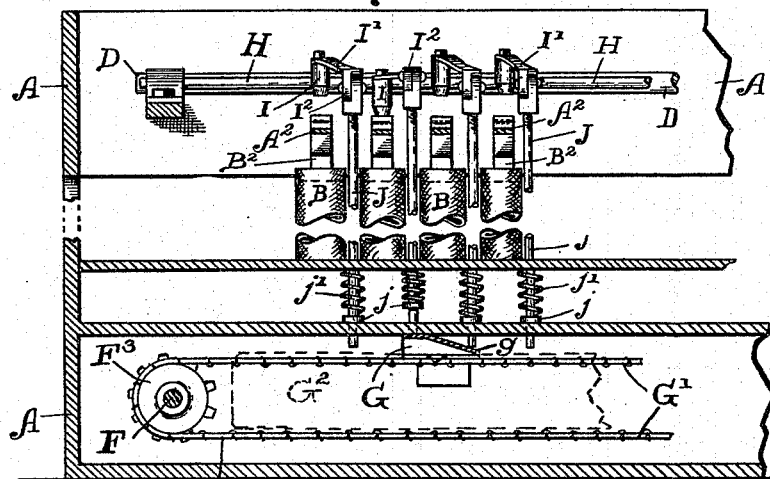

Referring to the accompanying drawings, which are made a part hereof, and on which similar letters of reference indicate similar parts, Figure 1 is a top or plan view of a dust collector embodying my present improvements; Fig. 2, a view partly in side elevation and partly in section (with a portion of the middle broken out) as seen from the dotted line 2 2 in Fig. 1; Fig 3, a transverse sectional view on the dotted line 3 3 in Fig. 1, on an enlarged scale, and Fig. 4 a detail view similar to a portion of Fig. 2, on an enlarged scale.

In said drawings the portions marked A represent the frame-work; B, the dust collecting tubes; C, the driving shaft; D, the hammer-operating shaft; E and F, shafts for chain belts carrying the dust receptacles; G, said dust receptacles; H, a pivot-shaft for the hammers; I, the hammers; J, rods for throwing the hammers into and out of operative position, and K the conveyer.

The frame-work A, as heretofore, is of any appropriate or desired construction, and of a size sufficient to accommodate the number of tubes required for the work to be performed. The bottom of this frame-work is in the form of a closed chamber, into which the blast of dust-laden air is conveyed, at any suitable point or from any desired direction, by an air tube, as A'. Within this chamber are the shafts E F and the dust receptacles G, and in a suitable way, preferably at one end and below the floor of said chamber, is the conveyer K.

The dust tubes B are similar to those shown in my former applications, and are of a suitable fabric through which the air under pressure may escape, while the dust is retained within them. At the bottom ends these tubes enter perforations of the plate B', which is stationary, and to which they are attached, and their open lower ends communicate with the chamber below. At the upper end each row of tubes is secured to a cross-bar $B^2$, and this is suspended to a flexible bar $A^2$ secured to the sides of the frame A. Where these two tubes join the cross-bar $B^2$ they are closed by any suitable construction. These tubes are shown in rows or sets, with ten in a set; but obviously single tubes or any other number may be similarly arranged.

The main shaft C is shown as driven by a belt C' from any suitable source of power. (Not shown.) Upon this shaft is a sprocket wheel $C^2$ which drives the chain belt $C^3$, which passes over the idlers E' and $C^4$ back to the wheel $C^2$. This chain belt is provided with projections $c^3$, and there are spiders $E^2$ on the shaft E, with the arms of which said projections will come in contact as the chain travels. The wheel E' being an idler wheel, running loosely on the shaft E, while the spiders $E^2$ are fixedly mounted thereon, the shaft E is only revolved when one of the projections $c^3$ comes in contact with arms of the spiders. Each movement so produced is sufficient to shift one of the dust receptacles from one row of tubes to another. Upon the shaft E, inside the chamber, are other sprocket wheels $E^3$, which, with similar sprocket wheels $F^3$ upon the shaft F, carry the chain belts to which the dust receptacles G are attached. Upon the other end of the main shaft C is a sprocket wheel $C^5$, which, through a chain belt $C^6$, drives the conveyer.

The shaft D is driven from the shaft C, preferably by means of miter gears *r s*, as shown most plainly in Fig. 1, and is provided with a wing *d* extending substantially the entire length thereof, which wing is adapted to engage with the projecting end of each of the spring-hammer handles, in succession, and thus raise one of said hammers each time the shaft revolves, while the spring-handle of the hammer causes said hammer, when said handle escapes from said wing, to descend forcibly upon the corresponding spring-bar $A^2$ above which it is positioned, jarring said bar and all the tubes which are connected thereto. As will be observed by an examination of the drawings, the several parts are so arranged that the hammer is operated which is directly above the dust receptacle; and as the dust receptacle shifts position, one hammer is thrown into and another out of operative posture, as will be hereinafter more fully described. The mechanism is so proportioned that the hammer-operating shaft D will revolve several times (I have found three times to be a desirable number), and thus the row of tubes receives several jars from the hammer before the mechanism is shifted to operate upon the next row. This is secured by means of the projections $c^3$ and the arms of the spiders $E^2$, as elsewhere explained; such arrangement permitting the shafts E and F to remain stationary for certain periods, and to have an intermitting movement.

The dust receptacles G are connected to chains G' running over the sprocket wheels $E^3$ and $F^3$, and said receptacles run on ways $G^2$ by which they are held to proper position. Upon the ends of said receptacles in the construction shown are cams in the form of inclines $g$ which operate the rods J, as will be presently described.

The shaft or rod H is mounted upon the frame-work A and serves as a pivot for the hammer-handles, over which they rock as said hammers are moved into and out of operative position.

The hammers I are mounted on spring hammer-handles I', which hammer-handles are mounted on the pivot rod H, and have extensions or arms $I^2$, (preferably of stiff or rigid construction,) extending out to the opposite side of said rod from said hammers, to which the operating rods are attached. As will be best understood by an examination of Figs. 1 and 4, these spring hammer-handles should be inclined somewhat to one side, in order to bring the hammer directly above the set of tubes, while the dust receptacle is directly below. This is, however, a mere convenience in construction, as it is easier to obtain the proper angle to the incline $g$ on the ends of the dust receptacle (which operate the rods J) by extending said inclines entirely across, than it would be to extend them only half-way across; so that the rod is raised to its highest position when in vertical line with the extreme rear side of the receptacle at the time in operative position, instead of when in line with its center; and so the hammer-handle is inclined to one side sufficiently to bring it over the center of the tubes and the center of said dust receptacle, instead of arranging the inclines differently.

The rods J are mounted in vertical bearings in the frame-work A, and are connected at the top to the outer arms or ends of the hammer-handles. At their lower ends they have collars $j$ which limit their downward movement, and, preferably, springs $j'$, by which they are commonly held to the extreme limit of said downward movement. When the inclines $g$ on the ends of the dust receptacles G pass under said rods, however, they are forced upwardly, as shown in the drawings, and thus the hammer is thrown down into position to be engaged by the wing $d$ on the shaft D, and operated. When the dust receptacle is moved on, and the rod escapes from the incline, its own gravity and the spring $j'$ will force it down, raising the hammer-handle out of the range or sweep of the wing $d$, and so only the hammer which is at the time operated by the incline, through its rod, is caused to operate upon and jar the dust tubes.

It will be understood that the dust receptacle G which is at the time in use, tightly covers the mouths of the tube or set of tubes B, and prevents the air pressure within the chamber from operating upon such tubes, while said dust receptacle is in position over their mouths. Said tubes, being relieved from such pressure, will collapse to some extent, which in itself will dislodge a large portion of the dust, so that it will fall into the receptacle. The blows of the hammer upon the spring support or flexible bar $A^2$ will effectually dislodge the remainder of the dust by jarring.

The dust receptacles are inverted when they reach the end of the course and discharge the dust into the conveyer by which it is conveyed out of the machine. They are two in number, so that one may be just entering upon its work at one end as the other is leaving it at the other end.

Having thus fully described my said invention, what I claim as new, and desire to secure by Letters Patent, is—

1. The combination, in a tubular dust collector, of a suitable frame-work, dust-collecting tubes mounted therein, a traveling dust receptacle arranged below said tubes, a series of hammers arranged above said tubes, and mechanism, operating from the traveling dust receptacle, for throwing the hammers successively into operative position in connection with the tube or row of tubes below which the dust receptacle is at the time positioned.

2. The combination, in a tubular dust collector, of a suitable frame-work, dust-collecting tubes mounted therein, a traveling dust receptacle under the lower ends of said tubes having a suitable cam a row of hammers pivoted above said tubes, rods connected to the outer ends of the hammer-handles and extending down into the path of the cam on the dust receptacle, and means for operating the hammer in position, substantially as set forth.

3. The combination, in a tubular dust collector, of a suitable frame-work, dust-collecting tubes mounted therein and suspended on spring-bars, an intermittingly traveling dust receptacle below said tubes having a cam thereon, a pivot rod above said tubes, a shaft having a wing for operating said hammers, and rods connected to the hammer-handles and extending down into the path of the cam on the dust receptacle, whereby said hammers are thrown successively into the path or sweep of the wing on said shaft and thus operated, substantially as set forth.

In witness whereof I have hereunto set my hand and seal, at Toledo, Ohio, this 22d day of March, 1894.

ALLEN C. BRANTINGHAM. [L. S.]

Witnesses:
ROBT. C. WHITTLESEY,
M. W. PLATT.